United States Patent [19]

Buchner

[11] Patent Number: 4,759,018
[45] Date of Patent: Jul. 19, 1988

[54] HIGHER ORDER DIGITAL TRANSMISSION SYSTEM INCLUDING A MULTIPLEXER AND A DEMULTIPLEXER

[75] Inventor: Johannes B. Buchner, Hilversum, Netherlands

[73] Assignees: AT&T Bell Laboratories, Murray Hill, N.J.; Philips Telecommunications BV, Hilversum, Netherlands

[21] Appl. No.: 875,196

[22] Filed: Jun. 17, 1986

[30] Foreign Application Priority Data

Jun. 17, 1985 [NL]  Netherlands .......................... 8501737

[51] Int. Cl.$^4$ .............................................. H04J 3/06
[52] U.S. Cl. ...................................... 370/112; 370/102
[58] Field of Search ........................ 370/112, 77, 102; 371/37, 42

[56] References Cited

U.S. PATENT DOCUMENTS

| 4,121,217 | 10/1978 | Chen | 370/112 |
|---|---|---|---|
| 4,143,246 | 3/1979 | Smith | 370/112 |
| 4,276,646 | 6/1981 | Haggard et al. | 371/37 |
| 4,410,980 | 10/1983 | Takasaki et al. | 370/102 |

OTHER PUBLICATIONS

J. B. Buchner, "Ternary Line Codes", Philips Telecommunication Review, vol. 34, No. 2, Jun. 1976, pp. 72–88.
A. Jessop, D. B. Waters, "4B-3T, An Efficient Code for PCM Coaxial Line Systems", *Proceedings of 17th International Scientific Congress on Electronics,* Mar. 16–17, 1970, Rome, Italy, pp. 275–283.
Recommendation G.922, "*Digital Line System at 564992 kbit/s on Coaxial Pairs*", CCITT Int'l Telephone and Telegraph Consulting Committee Book, Geneva, 1980, pp. 218–225.

*Primary Examiner*—Douglas W. Olms
*Assistant Examiner*—James E. Busch
*Attorney, Agent, or Firm*—Lucian C. Canepa

[57] ABSTRACT

Higher order digital transmission system including a multiplexer having N parallel inputs to which tributary input signal streams are applied, and a demultiplexer having N parallel outputs from which the tributary signal streams are taken. The signal processing operations, such as scrambling, justifying, line coding, error monitoring and word synchronization are effected before the multiplexer and after the demultiplexer, consequently not at the full line rate.

3 Claims, 4 Drawing Sheets

HIGHER ORDER DIGITAL TRANSMISSION SYSTEM INCLUDING A MULTIPLEXER AND A DEMULTIPLEXER

BACKGROUND OF THE INVENTION

1. Field of the Invention

The invention relates to digital transmission systems, and particularly, to a higher order digital transmission system including a digital multiplexer having N parallel inputs and a digital demultiplexer having N parallel outputs and a common digital path for transmitting N mutually synchronized digital signal streams between said multiplexer and demultiplexer.

2. Description of the Prior Art

In a digital multiplexer, N incoming signal streams (tributaries) are combined to form one outgoing signal stream, while the opposite operation occurs in the demultiplexer. Multiplexing the incoming signal streams is effected by means of interleaving, which implies that a bit from a binary signal stream 1 is followed by a bit from a binary signal stream 2 etc. The resultant outgoing signal stream has a digital rate which is higher than or equal to N times the digital rate of the N incoming signal streams. This is caused by the fact that the outgoing signal stream requires its own frame word and a few service bits, which are added to the outgoing signal stream. Provisions are also taken to compensate for frequency differences between the tributary signal streams and the multiplex clock. This is necessary since each of the tributary signals has its own free-running clock frequency. To this end, idle bits are injected into the multiplex signal, together with control bits, which indicate the status of the idle bits. This process is called positive justification and in general is the simplest manner of multiplexing plesichronous signal streams.

When digital signals are conveyed over long distances it is customary to use a form of encoding in the transmitter portion and a form of decoding in the receiver portion of the transmission system, such that the digital signal is adapted to the digital path. This digital path may, for example, be constituted by symmetrical or coaxial cables, optical fibers or the air. One of the objects usually is the suppression of the direct current component, which permits of the use of alternating current couplings in the transmission system, and direct current supply of the regenerators from the transmission system via the transmission cable being possible. Another object often is to increase the pulse density of the digital signal to be conveyed, or to ensure a minimum pulse density such that recovering a clock signal, required in regenerative circuits, is possible.

In a block encoding arrangement, use is made of what are commonly referred to as code translation Tables, such as the Tables described in, for example, *Philips Telecommunication Review*, vol. 34, no. 2, June, 1976, pages 72–86. A series/parallel converter which divides the bit stream applied to its input in consecutive blocks of a predetermined number of bits n is provided at the input of the encoding arrangement. A block of n bits is thereafter converted with the aid of the translation code matrix into a new block of m symbols in accordance with a specific instruction. Blocks of m symbols are reconverted at the output of the encoding arrangement with the aid of a parallel/series converter into a bit stream which is conveyed to the receiver portion of the digital transmission system via the digital path (cable, optical fiber). In the receiver portion of the system, the bit stream applied there is subjected to a reverse process with the aid of the decoding arrangement. Examples of an encoding arrangement and a decoding arrangement are described in, for example, *Proceedings 17th International Scientific Congress on Electronics*, Rome, 16–18, March 1970, pages 275–283.

A higher order digital multiplex system of the above-defined type is disclosed in, for example, C.C.I.T.T. Recommendation G922. In this disclosure the frame structure of a multiplex system having 4 tributary signal streams of 140 Mbit/s each is described. A frame has a length of 2688 bits and comprises a 12-bit frame synchronizing word; 4 service bits; 4 5-bit justification control words, one for each tributary signal stream; 4 justifiable bits, one for each tributary signal stream and 2648 time slots for the information from the four tributary signal streams. The block encoding arrangement is arranged subsequent to the multiplexer and the block decoding arrangement precedes the demultiplexer. This results in it being necessary that both the block encoding arrangement and the block decoding arrangement must be operated at the full line rate. When this line rate increases to above 565 Mbit/s, realizing the encoding and decoding arrangements becomes problematical, as low-dissipation digital modules are required. In the present state of the art of the industrial integration processes it is not possible to realize these modules, or it is very difficult to do so. Consequently, it is very difficult to apply in a higher order digital transmission system the same design philosophies customary for a lower order digital transmission system.

SUMMARY OF THE INVENTION

In accordance with this invention, a transmission arrangement comprises a transmission line for transmitting a serial signal stream, a multiplexer having N parallel inputs and having an output connected to said transmission line for multiplexing N parallel signal streams into a serial signal stream on said transmission line, N block encoder devices connected to said inputs of said multiplexer for generating encoded symbols to said inputs, a demultiplexer having an input connected to said transmission line and having a plurality of outputs for converting a serial stream of symbols into N parallel signal streams, and N block decoder devices connected to said outputs of said multiplexer for converting block encoded symbols into a decoded serial signal stream. Advantageously, this arrangement allows transmission block encoding/decoding of signals in conjunction with high data rate transmission systems. Further, in accordance with this invention, a matrix switch is provided for connection to the block decoder devices to allow output signal streams of the block decoder devices to be switched to appropriate output lines.

In one particular embodiment, each of the N digital signal streams is applied to one of the N parallel inputs of the multiplexer via a block encoding arrangement, N digital signal streams are entered synchronously under the control of a common clock signal into the N block encoding arrangements and, in the respective block encoding arrangements, are provided with a word synchronizing characteristic. The parallel outputs of the demultiplexer are each connected to the input of a block decoding arrangement and the signals applied to the parallel outputs of the demultiplexer are entered into the respective block decoding arrangements under the control of the clock signal recovered from the composite digital signal. Further, in one embodiment of the invention, the outputs of the block decoding arrangements are each connected to an input of a matrix switch having as many outputs as there are inputs. A phase comparator arrangement compares the word synchronizing characteristics of the block decoding arrangements with each other, whereafter as a function of the phase difference measured between said word synchronizing characteristics, each input of the matrix switch is through-connected to an output, such that the original digital signal streams become available again in the appropriate sequence at the outputs of the matrix switch.

BRIEF DESCRIPTION OF THE DRAWING

The invention will now be described in greater detail by way of example with reference to the accompanying drawing in which.

DETAILED DESCRIPTION

Figure 1:
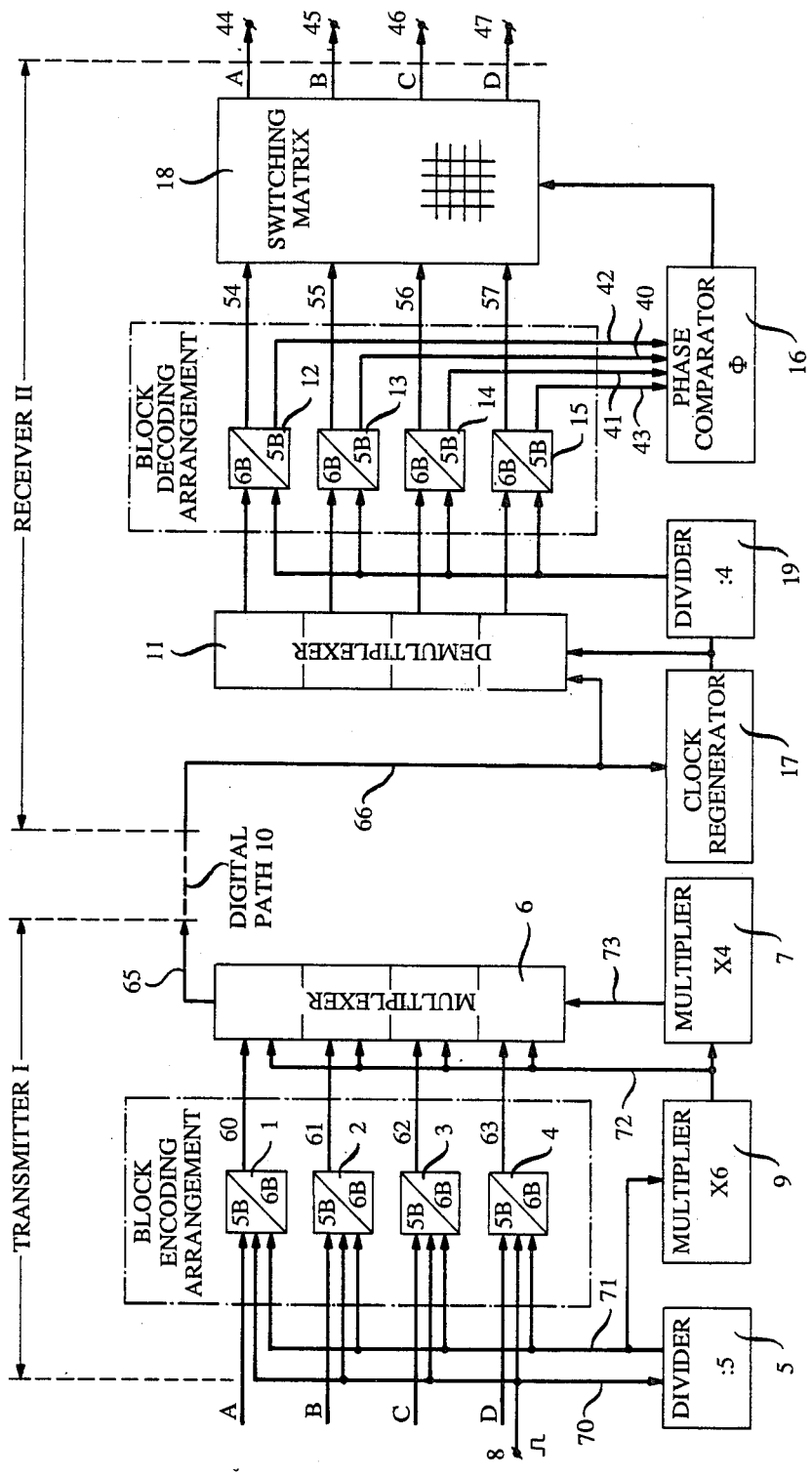
FIG. 1 shows a higher order digital transmission system according to the invention.

In the higher order digital transmission system shown in FIG. 1, I is the transmitter portion of the system and II the receiver portion of the system. The transmitter portion I comprises the block encoding arrangement 1, 2, 3 and 4, the multiplexer 6, the divider 5 and the multiplier 7 and 9. The receiver portion II comprises the block decoding arrangements 12, 13, 14 and 15, the demultiplexer 11, the phase comparator 16, the divider 19, the clock regenerator 17 and the switching matrix 18. The N mutually synchronized digital signal streams A, B, C and D are applied to the signal input of one of the respective block encoding arrangements 1 to 4. In the embodiment shown N=4. The write clock inputs of the block encoding arrangements 1 to 4 are together connected to the clock input 8 of the transmitter portion I of the transmission system via the line 70. The clock input 8 is connected via a divide-by-5-divider and the line 71 to the clock inputs of the block encoding arrangements 1 to 4, which from the four digital signal streams A to D form 5-bit blocks, and also to the input of a multiply-by-6 multiplier 9. The output of the multiply-by-6 multiplier 9 is connected via the line 72 to the write clock inputs of the multiplexer 6 and also via a multiply-by-4 multiplier 7 to the read clock output of the multiplexer 6. Each of the signal outputs 60 to 63 of the block encoding arrangements is connected to a signal input of the multiplexer 6. The signal output 65 of the multiplexer 6 is connected via a digital path 10 to the input 66 of the receiver portion II of the transmission system. The input 66 is connected to the signal input of the demultiplexer 11 and also to the input of the clock regenerator 17. The output of the clock regenerator 17 is connected to the clock input of the demultiplexer 11 and also to the input of a divide-by-4 divider 19. The output of the divider 19 is connected to the write clock inputs of the block decoding arrangements 12 to 15. Each signal input of the block decoding arrangements 12 to 15 is connected to a signal output of the demultiplexer 11. The signal outputs of the block decoder arrangements 12 to 15 are each connected to an input of the matrix switch 18. The outputs 40 to 43 are each connected to an input of the phase comparator 16, which output is connected to the control input of the switching matrix 18. The original digital signal streams A to D are again available in the appropriate sequence at the outputs 44 to 47 of the matrix switch 18.

Let it be assumed that the four incoming digital signals A to D are binary signals having a symbol rate (=bit rate) of 140 Mb/s. These digital streams are entered synchronously into the 5B/6B block encoding arrangements 1 to 4 with the aid of the 140 MHz clock signal present on the line 70. In the 5B/6B block encoding arrangements the 140 Mbit/s signal streams are divided by means of the 28 MHz clock signal present on the line 71 into blocks each having a length of 5 symbols. The 5-bit blocks are thereafter translated in the block encoding arrangements into blocks of 6 bits. The block encoding arrangements 1 to 4 produce at their respective outputs 60 to 63 digital signal streams of each $6/5 \times 140 = 168$ Mbaud. Outputs 60 to 63 of the block encoding arrangements 1 to 4 are entered in parallel into the multiplexer 6 with the aid of the clock signal produced by the multiplier 9 and having a frequency of $6 \times 28 = 168$ MHz. Using the clock signal present at the output of the multiplier 7, which signal has a digital rate of $4 \times 168 = 672$ MHz, the digital content of the multiplexer 6 is read serially.

Figure 2:
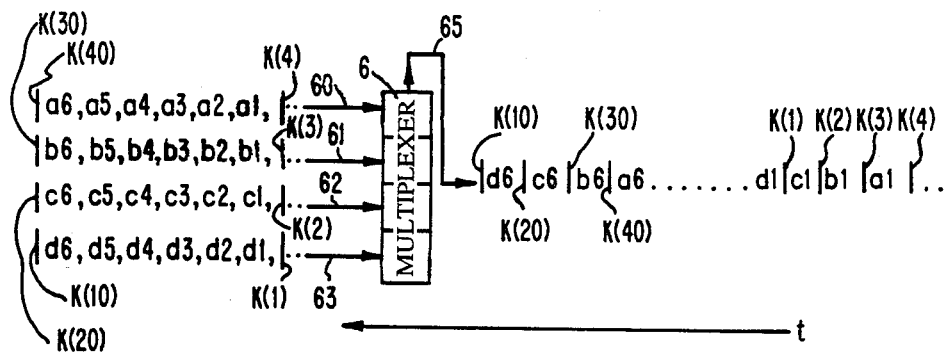
FIG. 2 shows a time-sequence diagram of the multiplexer.

In the four parallel 5B/6B block encoding arrangements, the 6B words are each provided with a word synchronizing characteristic. This characteristic may, for example, be a pulse of predetermined characteristics generated by each block encoder at the beginning or end of each 6-bit block or word. The block encoding arrangements may be any of a number of known encoder arrangements which encode signal streams into a sequence of symbols suitable for transmission over a transmission line. Since the four parallel 5B/6B block encoding arrangements 1 to 4 are controlled by the same 28 MHz clock signal and the block encoding arrangements 1 to 4 are identical, the 6B words will appear with the same phases at the outputs 60 to 63 of the block encoding arrangements. This is shown schematically in the time-sequence diagram of FIG. 2. The word synchronization characteristics K(1) lines arrive at the same instant at the outputs 60 to 63. Consequently, the mutual phase difference between the synchronization characteristics is equal to 0 degrees. With the aid of the 672 MHz clock signal present at the output of the multiplier 7 always 4 bits are arranged one after the other with the same indices. A composite digital signal of the shape shown in the time-sequence diagram of FIG. 2 appears at the output 65 of the multiplexer 6.

The composite digital signal is applied to the input 66 of the receiver section II of the digital transmission system via the digital path 10. Using the clock regenerator 17, the clock signal which is used for further signal processing in the receiver portion II of the transmission system is recovered from the composite digital signal. The recovered 672 MHz clock signal is applied to the clock input of the demultiplexer 11 and via a divider 19 to the clock inputs of the block decoding arrangements 12 to 15. In the demultiplexer 11 four symbols are inserted with the aid of the 672 MHz clock signal, which symbols are thereafter entered in parallel, with the aid of a clock signal having a frequency of $\frac{1}{4} \times 672 = 168$ MHz, into the four parallel block decoding arrangements 12 to 15. Thereafter, using the 672 MHz clock signal four new symbols are inserted, which symbols are thereafter entered in parallel with the aid of the 168 MHz clock signal into the four parallel block decoding arrangements 12 to 15, etc. The four possible phase positions of the decoder write clock (168 MHz) relative to the shift clock (672 MHz) and the digital signal streams produced at the four parallel outputs of the demultiplexer are shown relative to each other in the time-sequence diagrams of FIG. 3. In the time-sequence diagram of FIG. 3a, the four word synchronization characteristics K(1) ... K(4), and also the synchronization characteristics K(10) K(40) are mutually in phase. This implies that the demultiplexer 11 and multiplexer 6 are in synchronism with each other. The respective digital input signal streams A, B, C and D of the transmission system are available again at the outputs of the block decoding arrangements.

From the time-sequence diagrams shown in FIG. 3b, 3c and 3d it will be obvious that the three other phase positions result in a different phase pattern in the word synchronization characteristics K(1) ... K(4). The phase difference between the word synchronization characteristics is not equal to 0 degrees, as it is at the transmitter side I of the transmission system. In all these three cases the demultiplexer 11 and the multiplexer 6 are not mutually in synchronism.

In the time-sequence diagram of FIG. 3b the synchronization characteristics K(1) and K(10) have a time lead relative to the other synchronization characteristics K(2) to K(4) and K(20) to K(40), respectively. In the time-sequence diagram of FIG. 3c the synchronization characteristics K(1) and K(2) lead the synchronization characteristics K(3) and K(4). The synchronization characteristics K(10) and K(20) likewise have a time lead relative to the characteristics K(30) and K(40). In the time-sequence diagram of FIG. 3d the synchronization characteristic K(4) has a time lag relative to the other characteristics K(1) to K(3). The characteristic K(40) likewise lags the other characteristics K(10) to K(30).

Figure 4:
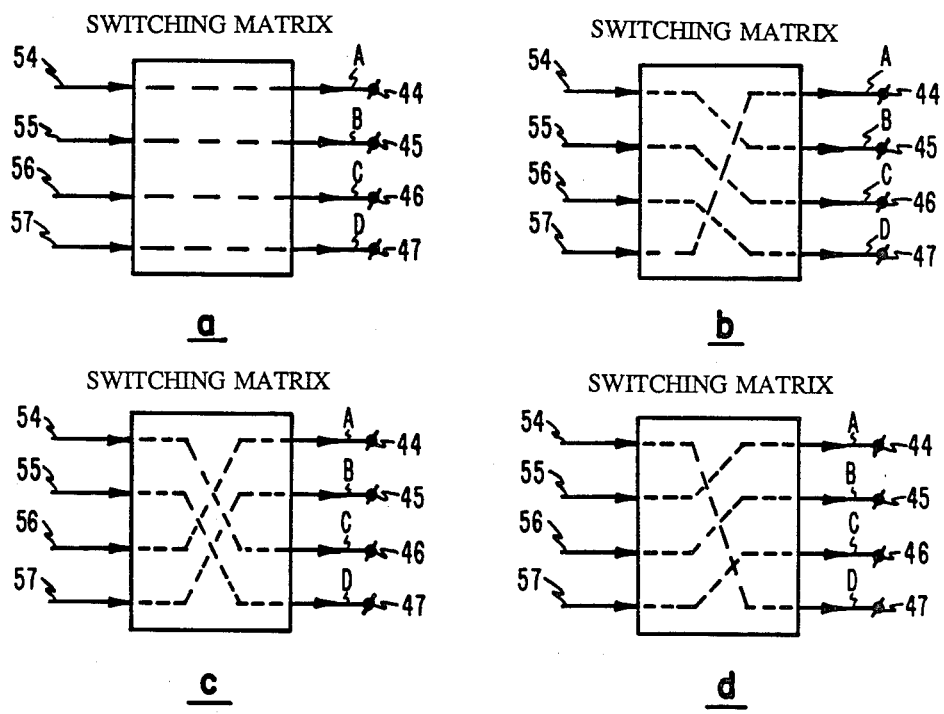
FIG. 4a–d four positions of the switching matrix as a function of the synchronization characteristics.
Figure 3:
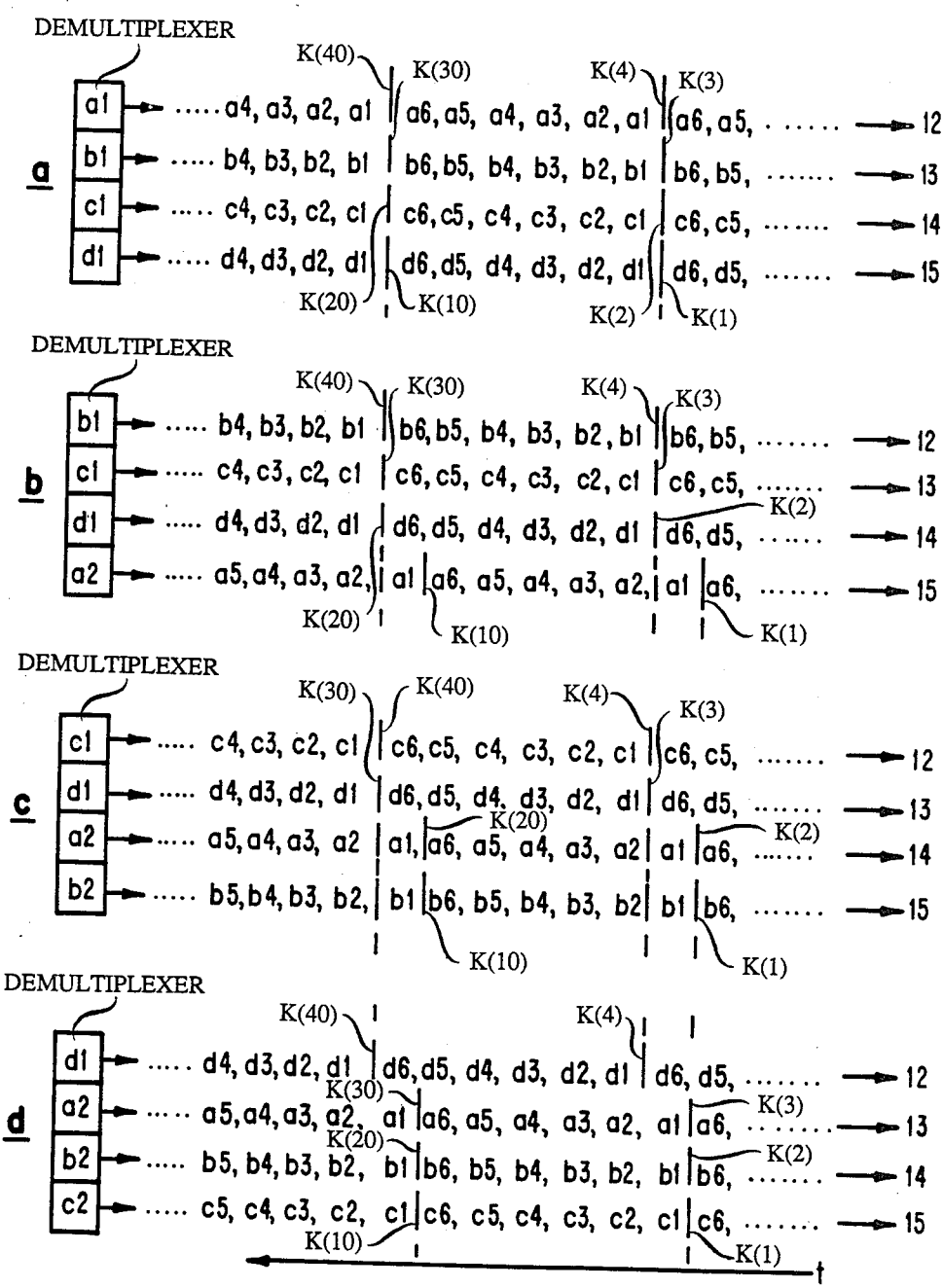
FIG. 3a–d time-sequence diagrams of the four possible phase positions of the demultiplexer.

The phase positions as shown in the FIG. 3b to 3d are detected by means of the phase comparator arrangement 16 (FIG. 1), whereafter a control signal is applied to the matrix switch 18 for establishing synchronization between the multiplexer 6 and the demultiplexer 11. The phase comparator arrangement 16 receives signals via lines 40 to 43 from the block decoders 12 to 15 indicative of the relative position of the word synchronization characteristics. The states of these leads indicate the presence or absence of the characteristics in the block decoding arrangements at any point in time, and conventional logic circuitry in the phase detector provides different control signals to the matrix switch 18 corresponding to the different conditions represented in FIG. 3. The switch matrix 18 responds to these different control signals to assume the switch matrix configurations shown in FIG. 4. When the phase comparator 16 detects a phase position as shown in FIG. 3a, the matrix switch 18 will be adjusted to the position shown in FIG. 4a with the aid of the control signal produced by the phase comparator 16. The inputs 54, 55, 56 and 57 are connected to the respective outputs 44, 45, 46 and 47. The original digital signal streams A, B, C and D are then again available in the appropriate sequence at said outputs of the matrix switch.

When the phase comparator 16 detects a phase position as shown in FIG. 3b, the matrix switch will be adjusted to the position shown in FIG. 4b with the aid of the control signal produced by the phase-comparator 16. The inputs 54, 55, 56 and 57 of the matrix switch 18 are through-connected to the respective outputs 45, 46, 47 and 44. The original digital signal streams A, B, C and D are then again available in the appropriate sequence at said outputs of the matrix switch 18.

When the phase comparator detects a phase position as shown in FIG. 3c, the matrix switch 18 will be adjusted to the position shown in FIG. 4c with the aid of the control signal produced by the phase comparator 16. The inputs 54, 55, 56 and 57 of the matrix switch 18 are through-connected to the respective outputs 46, 47, 44 and 45. The original digital signal streams A, B, C and D are then again available in the appropriate sequence at said outputs of the matrix switch 18.

When the phase comparator 16 detects a phase position as shown in FIG. 3d, the matrix switch 18 will be adjusted to the position shown in FIG. 4d with the aid of the control signal produced by the phase comparator 16. The inputs 54, 55, 56 and 57 of the matrix switch 18 are through-connected to the respective outputs 47, 44, 45 and 46. The original digital signal streams A, B, C and D are then again available in the appropriate sequence at said outputs of the matrix switch 18.

Synchronizing the transmitter portion and the receiver portion of a higher order digital transmission system in the above-described manner, using a matrix switch, has the advantage that this process occurs at a N times lower symbol rate. In the example outlined in the foregoing N=4. The fact that the block decoding arrangements 12 to 15 are likewise operated at a N times lower symbol rate is one of the reasons that it is possible to integrate said matrix switch and block decoding arrangements in spite of the high symbol rate of the digital signal incoming at the output 66 of the receiver portion II.

Using the matrix switch has the additional advantage that no information is lost because of the fact that during synchronization of the multiplexer 6 and the demultiplexer 11 the block decoding arrangements are mutually not out of synchronization. Information is indeed lost in those synchronization methods in which synchronization of the multiplexer and the demultiplexer is accomplished by means of suppressing one or more clock pulses of the demultiplexer write clock. Furthermore, in these methods, pulse suppression is effected at the highest symbol rate of the transmission system.

In addition, the described multiplexing method renders it possible to have all the signal processing operations, such as scrambling, justifying, line-coding, error-monitoring and word synchronization at a N times lower symbol rate. The multiplexer 6 and the demultiplexer 11 can be realized with the aid of a symbol parallel/series converter and a symbol series/parallel converter. It is also not necessary to add frame words and prolonged frame synchronization techniques.

Figure 5:
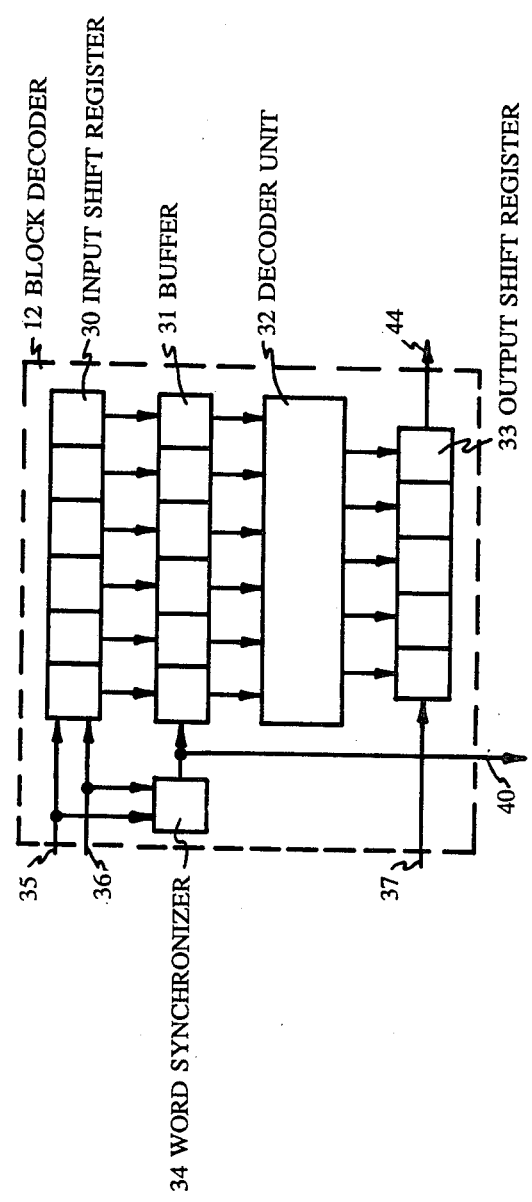
FIG. 5 shows an embodiment of a block decoding arrangement.

FIG. 5 shows an embodiment of a block decoding arrangement. It comprises an input shift register 30, a buffer 31, a decoder unit 32, and output shift register 33 and a word synchronizer 34. With the aid of the 168 MHz clock signal present at the clock input 36 a word having 6 binary symbols is written into the series register 30 via the input 35; see, for example, FIG. 3a the word $a_1 \ldots a_6$. The word synchronizer 34 detects the presence of a word synchronization characteristic on input line 35, e.g. K(40), and produces a synchronization pulse in response to which the content of the series register 30 is transferred to the buffer 31. The synchronization pulse is also applied to an input of the phase comparator 16 via the line 40. Using the decoder unit 32, the word having 6 binary symbols is converted into a word having 5 binary symbols which is applied in parallel to the output register 33. This output register is read with the aid of the 140 MHz clock signal present at the clock input 37. The 168 MHz clock signal to clock input 36 is provided by divider 19. The 140 MHz clock signal to clock input 37 is derived from the 168 MHz signal of divider 19 by circuitry (not shown in the drawing) which divides the 168 MHz clock signal by 6 and multiples by 5.

It is to be understood that the above-described arrangement is merely illustrative of the application of the principles of the invention and that other arrangements may be devised by those skilled in the art without departing from the spirit and scope of the invention.

What is claimed is:

1. For use in a digital transmission system comprising means for generating a multiplexed stream of encoded signal blocks, demultiplexer means for demultiplexing said multiplexed stream into N block encoded signal streams and N block decoders connected in said demultiplexer means; each of said decoders individually responsive to one of said N block encoded signal streams to generate a decoded signal stream, wherein said multiplexed stream of encoded signal blocks includes a word synchronization characteristic for each encoded signal block, said arrangement further comprising phase comparator means responsive to said word synchronization characteristics to generate switch matrix control signals said arrangement still further comprising a matrix switch having N inputs connected to said N decoders having N switch matrix outputs and responsive to said matrix switch control signals for selectively transferring signal streams from said block decoders to any of said matrix switch outputs.

2. A higher order digital transmission system including a multiplexer having N parallel inputs and a digital demultiplexer having N parallel outputs for transmitting N mutually synchronized digital signal streams through a common digital path between said multiplexer and said demultiplexer, where N≧2 and the multiplexer being arranged for cyclically and symbol-sequential interleaving the digital signal streams to form a composite digital signal stream, the transmission system including at least a block encoding arrangement and at least a block decoding arrangement, characterized in that each of the N digital signal streams are applied to one of the parallel inputs of the multiplexer via a block encoding arrangement, that the digital signal streams are under the control of a common clock signal and, in the respective block encoding arrangements are provided with a word synchronization characteristic, that the parallel outputs of the demultiplexer are each connected to the input of a block decoding arrangement; that the signals applied to the parallel output of the demultiplexer are entered into the respective block decoding arrangements under the control of the clock signal recovered from the composite digital signal, that the outputs of the block decoding arrangements are each connected to an input of a matrix switch having as many outputs as there are inputs, that in a phase comparator arrangement the word synchronization characteristics of the block decoding arrangements are compared with each other, whereafter as a function of the phase differences measured between said word synchronization characteristics each input of the matrix switch is through-connected to an output, such that the original digital signal streams become available again in the appropriate sequence at the outputs of the matrix switch.

3. For use in a digital transmission system comprising means for demultiplexing a multiplexed stream of block encoded signals, multiplexer means having N parallel inputs for generating said multiplexed stream of block encoded signals and N block encoder devices individually connected to said N inputs of said multiplexer means for generating encoded signals to said inputs, wherein said block encoder devices further generate a word synchronization characteristic for each block of encoded signals, wherein said means for demultiplexing demultiplexes said multiplexed stream into N block encoded signal streams and applies said streams to N respective decoders, said arrangement further comprising a matrix switch connected to the outputs of said decoders and phase comparator means responsive to said word synchronization characteristics for generating control signals for said matrix switch.

* * * * *

UNITED STATES PATENT AND TRADEMARK OFFICE
CERTIFICATE OF CORRECTION

PATENT NO. : 4,759,018

DATED : Jul. 19, 1988

INVENTOR(S) : Johannes B. Buchner

It is certified that error appears in the above-identified patent and that said Letters Patent is hereby corrected as shown below:

On the Cover page at [73], "AT&T, Murray Hill, N.J.; Philips Telecommunications B.V., Hilversum, Netherlands" should read --AT&T and Philips Telecommunications B.V., Hilversum, The Netherlands--.

Signed and Sealed this

Twentieth Day of December, 1988

Attest:

DONALD J. QUIGG

*Attesting Officer*

*Commissioner of Patents and Trademarks*